(12) United States Patent
Ichioka et al.

(10) Patent No.: US 7,114,758 B2
(45) Date of Patent: Oct. 3, 2006

(54) STORAGE APPARATUS FOR VEHICLE

(75) Inventors: Hiroaki Ichioka, Kanagawa (JP);
Takashi Matsumoto, Kanagawa (JP)

(73) Assignee: Piolax Inc., Yokohama (JP)

( * ) Notice: Subject to any disclaimer, the term of this patent is extended or adjusted under 35 U.S.C. 154(b) by 0 days.

(21) Appl. No.: 11/038,463

(22) Filed: Jan. 21, 2005

(65) Prior Publication Data

US 2005/0230991 A1   Oct. 20, 2005

(30) Foreign Application Priority Data

Mar. 31, 2004  (JP) ............. P. 2004-104259

(51) Int. Cl.
*B60N 3/12*   (2006.01)
(52) U.S. Cl. .................. 296/37.8; 296/37.12
(58) Field of Classification Search ............. 296/37.1, 296/37.8, 37.12, 37.13
See application file for complete search history.

(56) References Cited

U.S. PATENT DOCUMENTS 6,857,675 B1 * 2/2005 Kurachi et al. .......... 296/37.12

FOREIGN PATENT DOCUMENTS

| EP | 0562284 A1 | * | 2/1993 |
| JP | 62-43847 | | 3/1987 |
| JP | 5-76894 | | 10/1993 |
| JP | 09317317 A | * | 12/1997 |
| JP | 20000170441 A | * | 6/2000 |

* cited by examiner

*Primary Examiner*—Jason Morrow
(74) *Attorney, Agent, or Firm*—McGinn IP Law Group, PLLC

(57) ABSTRACT

In a storage apparatus for a vehicle including a lid which can rotate about a pivot, and a damper device having a cord-like connecting member and adapted to generate damping force against pulling force from the connecting member, wherein a connecting wire (the connecting member) is pulled, when the lid rotates in one direction, thereby to generate the damping force in the damper device, it is so constructed that a damping force control member having a guide face for the connecting wire is fixed to the lid, and when the lid has rotated in a direction of receiving the damping force, the connecting wire is wound around the guide face and pulled.

4 Claims, 8 Drawing Sheets

STORAGE APPARATUS FOR VEHICLE

BACKGROUND OF THE INVENTION

1. Field of the Invention

The present invention relates to a storage apparatus for a vehicle, which has a lid rotatable about a pivot, such as a glove box provided on an instrument panel of the vehicle.

2. Description of the Related Art

In many storage apparatuses for vehicles, such as glove boxes, there are provided damper devices in order to restrain sudden rotation of a lid by its own weight. As the damper device of this type, a damper of air system as shown in JP-UM-A-5-76894, for example, has been proposed.

The conventional damper device of this type, though not specifically illustrated herein, mainly includes three components, namely, a cylinder, a piston, and a pulling wire. The piston provided with a seal ring on its periphery is slidably contained in a cylinder and urged by a compressive coil spring in one direction. Meanwhile, a guide cap is fitted to an opening of the cylinder at its front side, and one end of the pulling wire which is arranged in a desired direction is connected to the piston, by way of the guide cap, inside the cylinder.

Moreover, a back wall having a cylindrical part and an air port is integrally formed with a backward end part of the cylinder. In the cylindrical part of the back wall, a seat valve formed with an orifice, a backup spring, and an air filter are arranged in this order, and a side of the air filter is retained by a retainer having an opening.

The damper device having the above described structure is mounted on the vehicle in such a manner that the cylinder is fixed to either one of the glove box side and the instrument panel side, and the other end of the pulling wire which has been arranged by way of the aforesaid guide cap is fixed to the other side. Then, on occasion of actual operation, by rotating the glove box in an opening direction utilizing its own weight, the pulling wire is pulled outwardly from the cylinder, and accordingly, the piston will be slid toward the guide cap against an urging pressure of the compressive coil spring, thereby to permit the glove box to rotate.

However, while the glove box rotates, air will be sucked in from minute holes of the air filter, according to the sliding motion of the piston, through the orifice of the seat valve into the cylinder. Because negative pressure will be formed inside the cylinder and damping force will be exerted on the sliding motion of the piston, an opening motion of the glove box will be controlled, ensuring that the glove box will be slowly rotated in the opening direction.

However, the lid of the glove box is generally kept in almost upright position in a completely closed state, and has its center of gravity positioned above a rotation pivot. The center of gravity will move, along with the opening motion, in a direction away from a vertical line passing the rotation pivot. Accordingly, when the lid conducts the opening motion from the completely closed state to a fully opened state, the rotation moment of the lid by its own weight has been small at the beginning of the opening motion, and thereafter, becomes gradually larger.

Therefore, in order to open the lid at a fixed speed, it is necessary to control the damping force by the damping device so that the damping force may become gradually larger according to the opening motion of the lid.

In JP-UM-A-62-43847, in order to control the damping force of the damper device, attention has been paid to an orbit of a pivotal point (a connecting point) of a rod transmitting the damping force of the damper device, with respect to the lied, and there is disclosed such a structure that a tangent line is drawn at an intermediate position of an arc-shaped orbit of the rod from the completely closed state to the fully opened state of the lid, and a pivotal point (a mounting point) of the damper device with respect to the glove box is positioned on the tangent line.

However, as the structure described in JP-UM-A-62-43847, the mounting position of the damper device has been determined, only from a viewpoint of controlling the damping force, and freeness of designing the glove box has been restricted. Specifically, a size, a shape, and assembling position of the glove box have been severely designed in adjustment relative to various other components to be incorporated into the instrument panel of the vehicle. Under the circumstances, it is desirable that the mounting position of the damper device too can be flexibly subjected to change of design, while adjustment is made with respect to these components in the surroundings.

SUMMARY OF THE INVENTION

This invention has been made in view of such circumstances, and it is an object of the invention to provide a storage apparatus for a vehicle in which an appropriate damping force can be obtained according to a change of rotation moment of a lid by its own weight, without restricting mounting position of a damper device.

In order to attain the above described object, according to a first aspect of the invention, there is provided a storage apparatus for a vehicle including a lid which can rotate about a pivot, and a damper device including a cord-like connecting member and adapted to generate damping force against pulling force from the connecting member, the connecting member being pulled, when the lid rotates in one direction, thereby to generate the damping force in the damper device, characterized in that a damping force control member having a guide face for the connecting member is fixed to the lid, and when the lid has rotated in a direction of receiving the damping force, the connecting member is wound around the guide face and pulled.

According to the first aspect of the invention, the damping force control member rotates integrally with the lid so as to wind the connecting member around the guide face thereof. A winding length of the connecting member with respect to rotation angle of the lid is determined by a contour of the guide face. When the lid rotates at a fixed speed, in case where the winding length per unit angle is short and an amount of the connecting member to be drawn out is small, the damping force of the damper device will be decreased. On the other hand, in case where the winding length per the unit angle is long and the amount of the connecting member to be drawn out becomes large, the damping force of the damper device will be increased.

Accordingly, by simply adjusting the contour of the guide face of the damping force control member, an appropriate damping force can be obtained according to a change of the rotation moment of the lid by its own weight. As the results, it has become possible to flexibly design the storage apparatus, without restricting the mounting position of the damper device.

In this case, the guide face of the damping force control member may preferably have radiuses of rotation which have been adjusted according to the rotation moments of the lid by its own weight at corresponding rotation angles.

For example, in case where the rotation moment by the own weight is small in an initial stage in which the lid rotates in a direction of receiving the damping force, the guide face of the damping force control member may preferably have the radius of rotation which has been set to be shorter in a region of a fixed range from a winding starting end of the connecting member, as compared with the radius of rotation at a terminal end.

According to this structure, in the region where the guide face has the small radius of rotation, the winding length of the connecting member per the unit rotation angle is short, and therefore, the damping force generated in the damper device becomes small. By controlling in this manner the damping force of the damper device so as to be small in correspondence with the initial stage in which the rotation moment by the own weight of the lid is small, a smooth rotation of the lid can be assured.

Further, the damping device may be so constructed that the guide face of the damping force control member has a flat face in the region of a fixed range from the winding starting end of the connecting member, and that when the lid has rotated by a fixed angle in a direction of receiving the damping force, the connecting member comes in contact with the region substantially at the same time.

By constructing in this manner, the connecting member will be pulled following the starting end of the guide face, in the fixed range of angles after the lid has started to rotate. Because the starting end of the guide face has the short radius of rotation, the amount of the connecting member to be drawn out is small. As the results, the damping force of the damper device will be small.

Further, according to the invention, a guide member around which the connecting member extending from the damper device is wound, thereby to guide the connecting member to the damping force control member may be further provided. By moving around this guide member, the connecting member can be guided to the guide face of the damping force control member from a desired direction, irrespective of the mounting position of the damper device. As the results, it has become possible to freely lay out the damper device, and freeness of design will be further enhanced.

As has been described herein above, according to the invention, by simply adjusting the contour of the guide face of the damping force control member, an appropriate damping force can be obtained according to a change of the rotation moment of the lid by its own weight, without restricting the mounting position of the damper device. As the results, it has become possible to flexibly design the storage apparatus, without restricting the mounting position of the damper device.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

Now, an embodiment of the invention will be described in detail, referring to the drawings.

Figure 1:
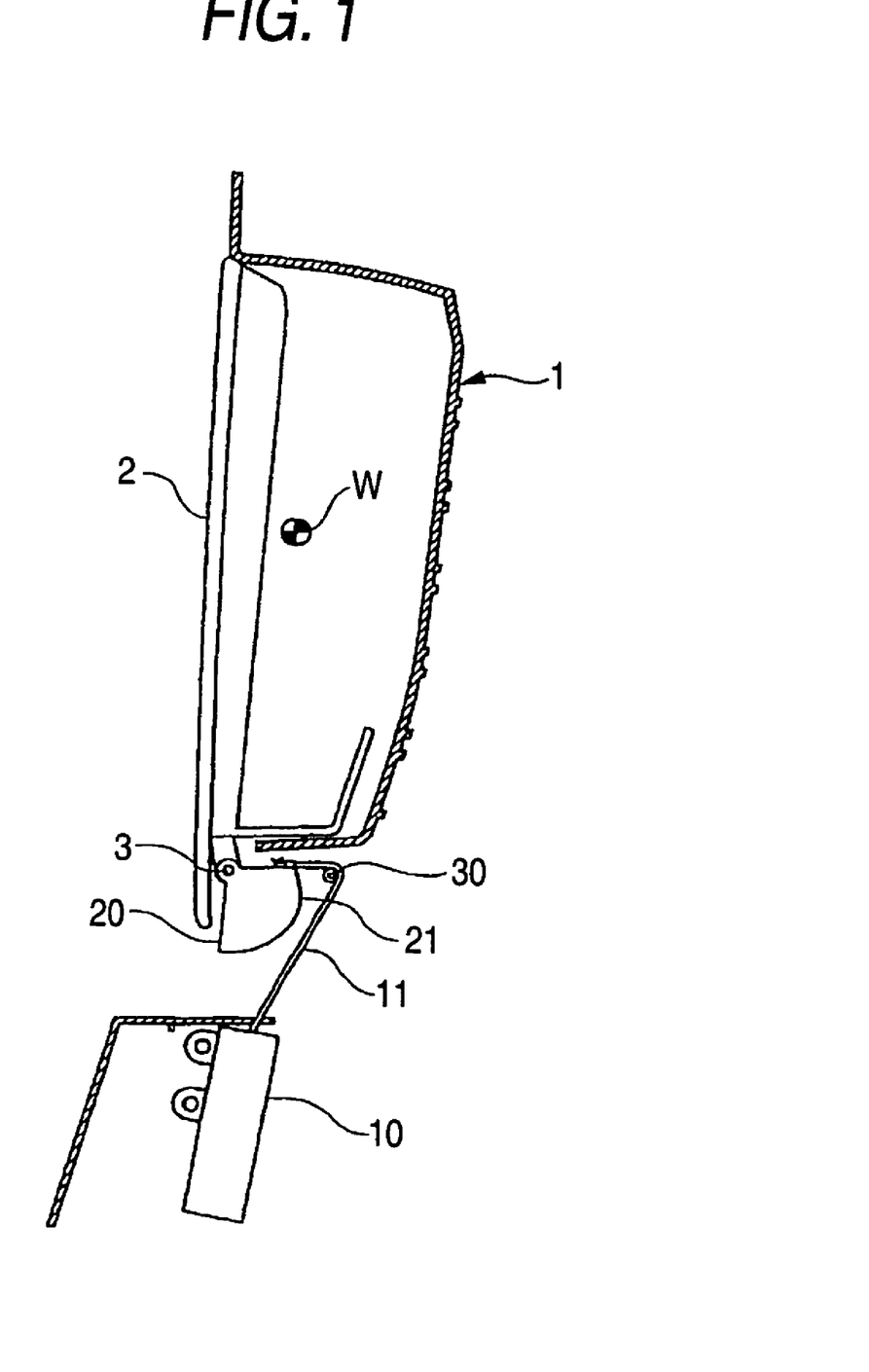
FIG. 1 is a sectional side view showing an embodiment in which the invention has been applied to a glove box of an automobile.

FIG. 1 is a sectional side view showing an embodiment in which the invention has been applied to a glove box of an automobile.

The glove box is constructed in such a manner that a storage space is formed inside a body 1, and a lid 2 is attached to an opening on its front face so as to be opened or closed. The lid 2 is attached to the body 1 at both sides of its lower end in a manner rotatable around the lower end as a pivot 3. The lid 2 is in almost upright position in its completely closed state (the state as shown in FIG. 1). In this state, a center of gravity W of the lid 2 lies at a position somewhat inward (a right side in the drawing) from a vertical line extending above the rotation pivot 3. Accordingly, a rotation moment of the lid 2 by its own weight is exerted in a direction of closing the lid 2 (a clockwise direction in FIG. 1), and keeps the lid 2 in the completely closed state, unless the lid 2 is pulled down to the front by a man's hand.

The body 1 of the glove box is provided with a damper device 10 at a position below the lid 2. A connecting wire 11 as a connecting member is extended from the damper device 10, and a base end of the connecting wire 11 is connected to a piston inside a cylinder of the damper device 10. The damper device 10 has such a structure that when the connecting wire 11 is pulled outwardly, damping force resisting against its pulling force will be generated inside the cylinder.

Although description of an internal structure of the damper device 10 will be omitted in this specification, there have been known, as the damper device to be employed in the glove box of this type, for example, a spring type damper device which is disclosed in Japanese Utility Model publication No. JU-A-5-76894, and an air damper which is disclosed in Japanese Patent Publication No. JP-A-2000-145862. However, the invention is not limited to these damper devices, but may be applied to damper devices of various structures in which the damping force is generated against the pulling force of the connecting member. In case where a tip end portion of the piston is exposed from the cylinder, as in an air damper disclosed in Japanese Patent Publication No. JP-A-2000-120744, a cord-like connecting member made of a connecting wire or the like may be fastened to the tip end portion of the piston.

A damping force control member 20 in a sector shape is fitted to the rotation pivot 3 of the lid 2. This damping force control member 20 rotates integrally with the lid 2 about the rotation pivot 3. An outer peripheral face of the damping force control member 20 will act as a guide face 21 for the connecting wire 11.

Moreover, a pulley 30 as a guide member is rotatably provided in a deeper position behind a tip end of the guide face 21 which is formed on the damping force control member 20, at a substantially same height as the tip end of the guide face, when the lid 2 is in the completely closed state. An intermediate portion of the connecting wire 11 is wound around this pulley 30. A distal end of the connecting wire 11 is guided toward the damping force control member 20 by way of the pulley 30, and fixed to the tip end of the guide face 21 which is formed on the damping force control member 20. The tip end of the guide face 21 formed on the damping force control member 20 will become a winding starting end 21a of the connecting wire 11, when the lid 2 is rotated in an opening direction from the completely closed state.

Figure 2:
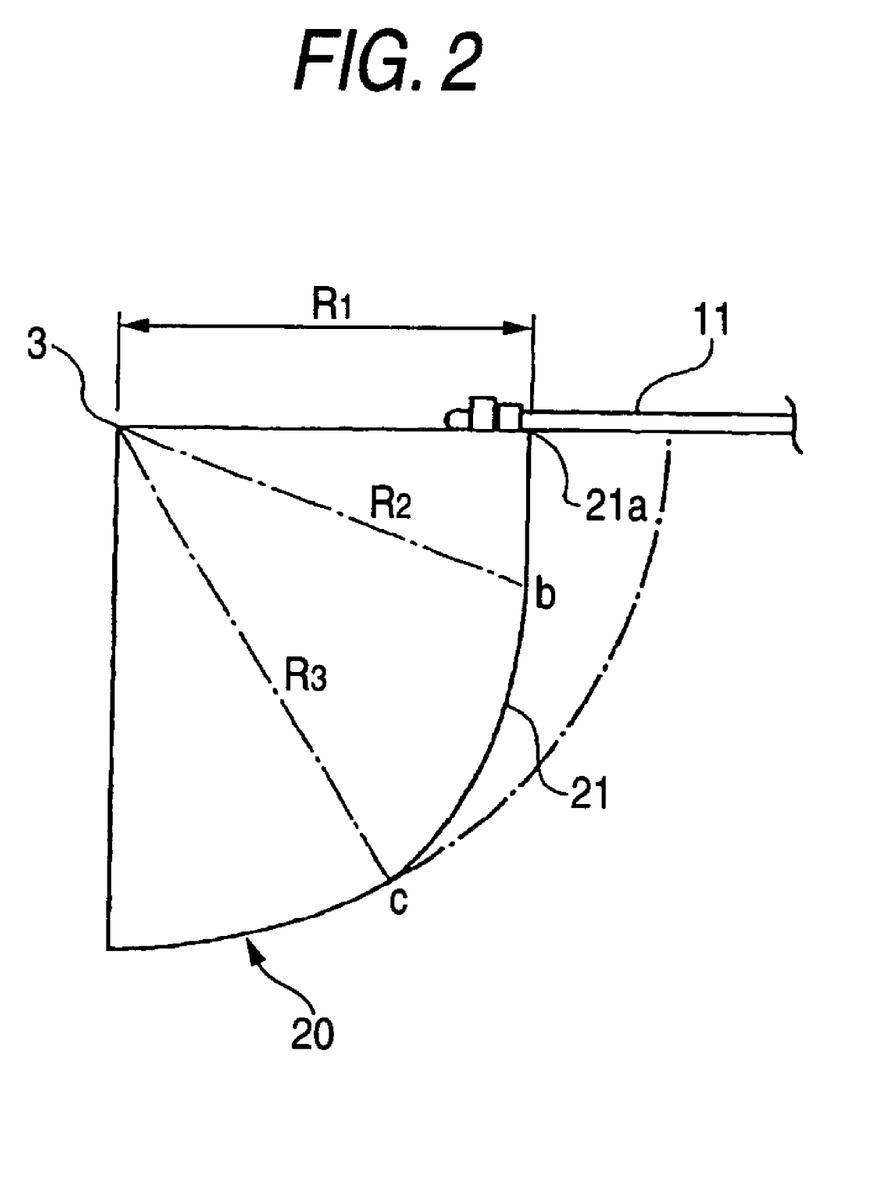
FIG. 2 is a side view showing an outer contour of a damping force control member.

FIG. 2 is a side view showing an outer contour of the damping force control member.

In the damping force control member 20, radiuses of rotation at respective points of the guide face 21 have been set according to the rotation moments of the lid 2 by its own weight at corresponding rotation angles. Therefore, the damping force control member 20 has such an outer contour as shown in FIG. 2.

Figure 3A:
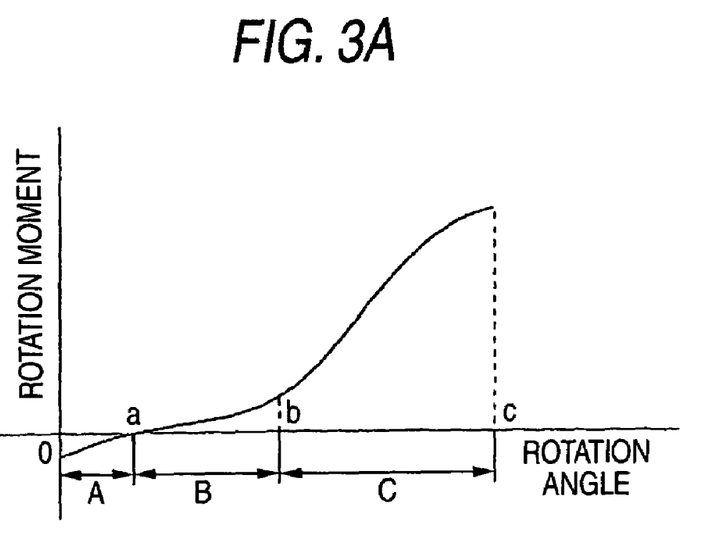
FIG. 3A is a graph showing relation between rotation angles and rotation moments of a lid.

In the glove box having the structure as shown in FIG. 1, the rotation moment of the lid 2 by its own weight will change as shown in FIG. 3A, according to the rotation angles from the completely closed state. Specifically, provided that the rotation moment in a direction of opening the lid 2 is positive value, the rotation moment of the lid 2 by its own weight indicates a negative value in a region A from the completely closed position to a rotation angle a at which the center of gravity W of the lid 2 goes beyond the vertical line passing the rotation pivot 3. Therefore, it is not necessary to apply the damping force by the damper device 10 in this region A.

In a region B from a point where the center of gravity W of the lid 2 has gone beyond the vertical line passing the rotation pivot 3 up to a rotation angle b at which the rotation moment starts to rapidly increase, the damping force by the damper device 10 may be kept small.

Further, in a region C from the rotation angle b at which the rotation moment has started to rapidly increase up to the completely opened position c, a large damping force by the damping device 10 will be required.

Figure 3B:
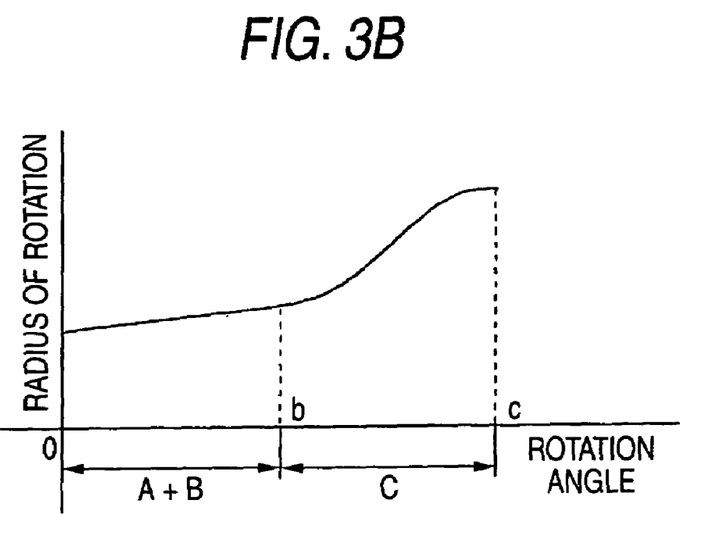
FIG. 3B is a graph showing radiuses of rotation at respective points of a guide face corresponding to rotation angles of the damping force control member.

In view of such circumstances, in this embodiment, the radiuses of the rotation at the respective points of the guide face 21 which is formed on the damping force control member 20 are set as follows (See FIG. 2 and FIG. 3B). It is to be noted that the radius of rotation of the guide face 21 means a length from the rotation center of the lid 2 to the guide face 21.

In the above described regions A and B of the rotation angles of the lid 2, the damping forces of the damper device 10 may be kept small. Accordingly, in the region A+B of the guide face corresponding to the regions of the rotation angles, the radiuses of the rotation are set to be short. Further, in this embodiment, the guide face 21 is formed to have a flat face 21b in this region A+B as shown in FIG. 2, and it is so adjusted that the connecting wire 11 may not be wound around the guide face 21 of the damping force control member 20, while the lid 2 rotates in the regions A and B.

In this manner, the connecting wire 11 will be pulled, following the starting end 21a of the guide face 21. Because the radius of rotation R1 at the starting end 21a of the guide face 21 is short, an amount of the connecting wire 11 to be drawn out is also small. As the results, the damping force of the damper device 10 will be small.

Then, in the above described region C of the rotation angle of the lid 2, the large damping force of the damper device 10 is required. Accordingly, in the region C of the guide face corresponding to the relevant region of the rotation angle, the radius of rotation is set to be long according to an increase of the rotation moment. In this region C, the connecting wire 11 will be wound around the guide face 21 and drawn out. Because the radius of rotation of the guide face 21 is long in this region, the amount of the connecting wire 11 to be drawn out becomes large. As the results, the damping force of the damper device 10 will be large.

In FIG. 2, the radius of rotation of the guide face 21 corresponding to the rotation angle b of the lid 2 is represented by R2, and the radius of rotation of the guide face 21 corresponding to the rotation angle c of the lid 2 is represented by R3.

Figure 4:
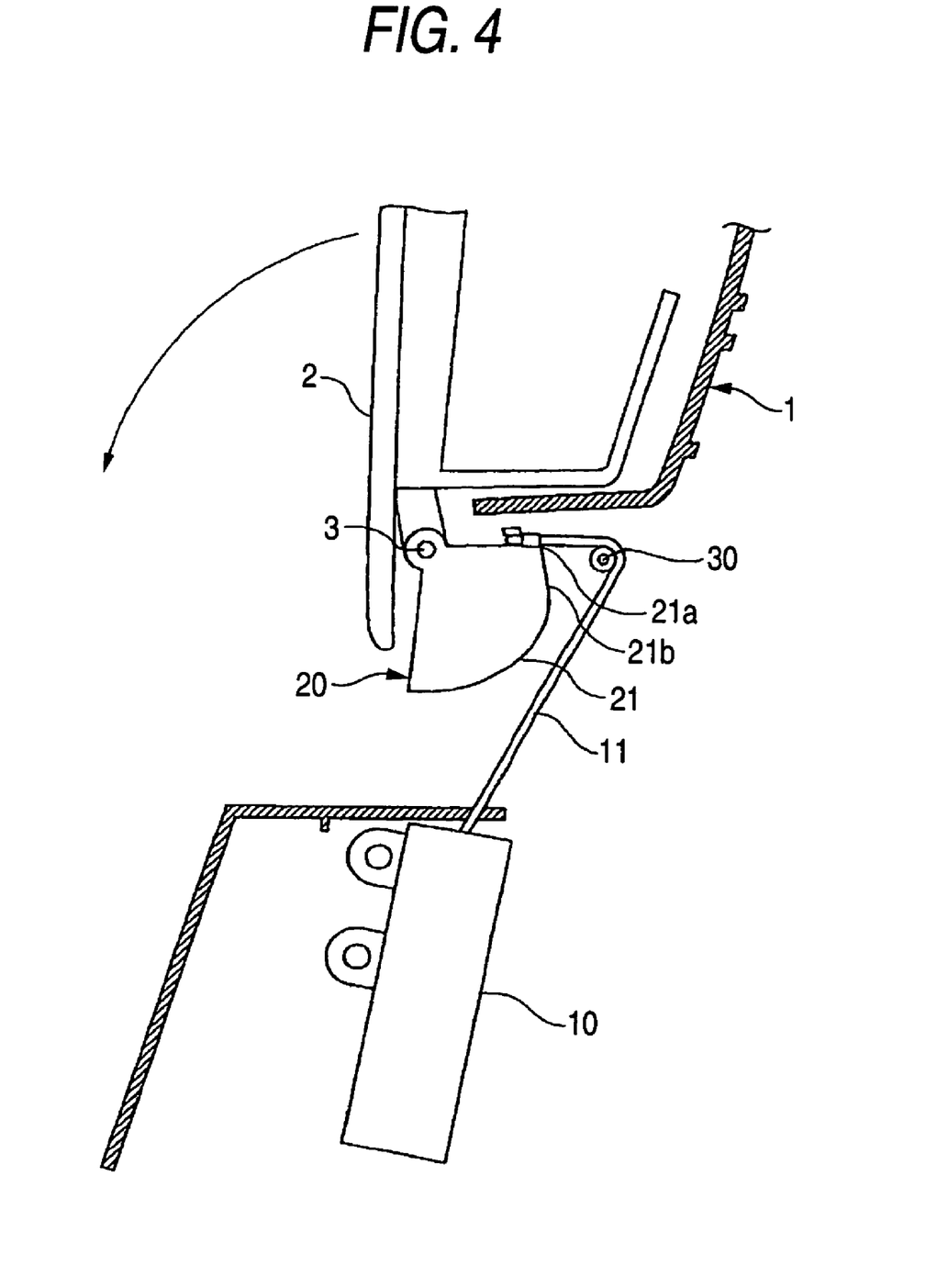
FIG. 4 is a sectional side view for explaining operation of the glove box according to the embodiment.

Then, operation of the above described glove box will be described referring to FIGS. 4 to 6. When the lid 2 is pulled down to the front from the completely closed position, as shown in FIG. 4, and rotates by its own weight in the opening direction (in a counterclockwise direction in the drawing), the damping force control member 20 also rotates integrally with the lid 2. Then, the connecting wire 11 will be pulled by the starting end 21a of the guide face 21 to be drawn out, thereby to generate the damping force in the damper device 10. However, until the connecting wire 11 comes into contact with the flat face 21b which is defined at a fixed range from the starting end 21a of the guide face 21, the connecting wire 11 will be pulled following the starting end 21a of the guide face 21 which has the short radius of rotation as described above. Accordingly, the amount of the connecting wire 11 to be drawn out per a unit rotation angle will be smallest, and the damping force of the damper device 10 will be small.

Figure 5:
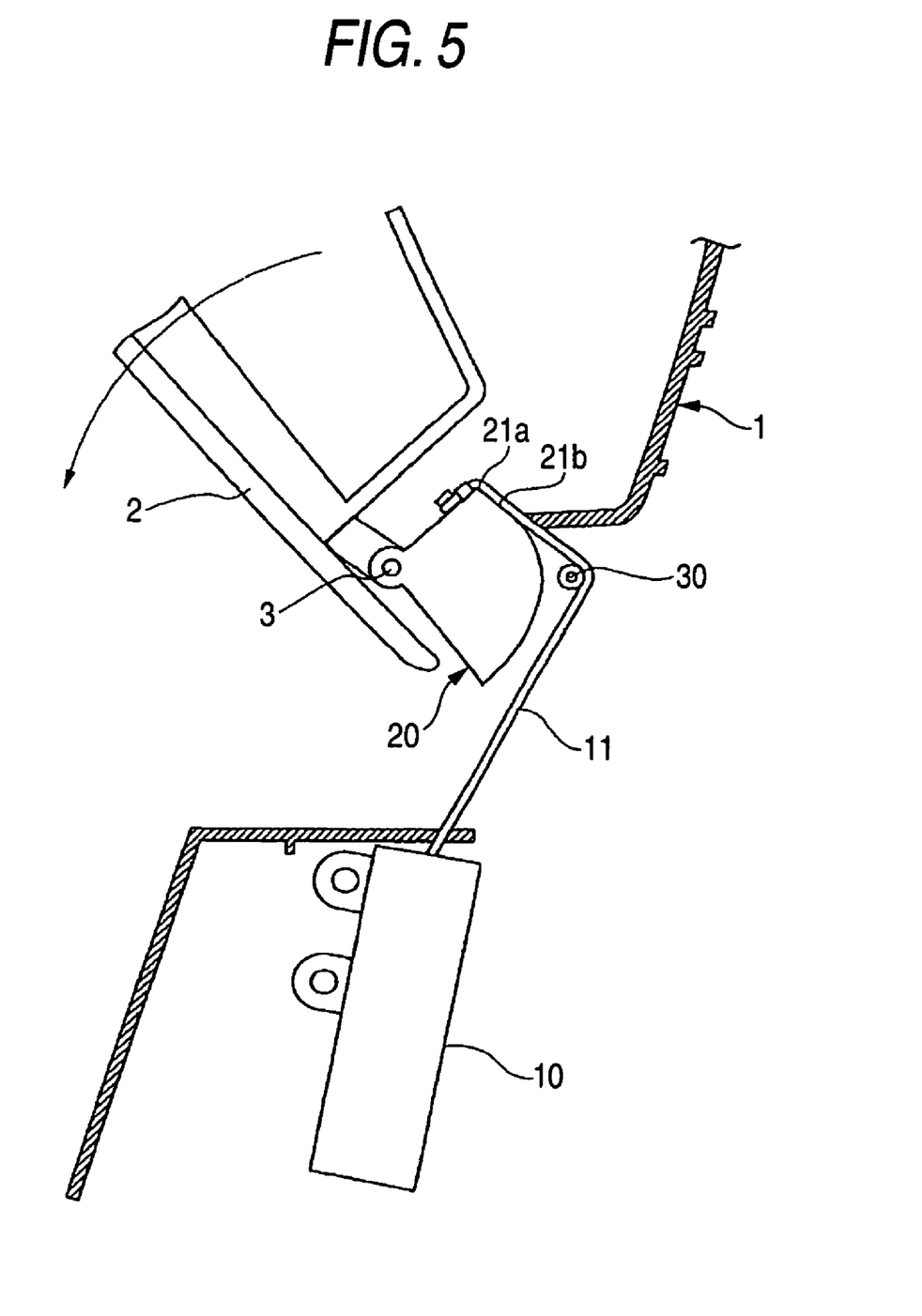
FIG. 5 is a sectional side view for explaining the operation of the glove box continued from FIG. 4.
Figure 6:
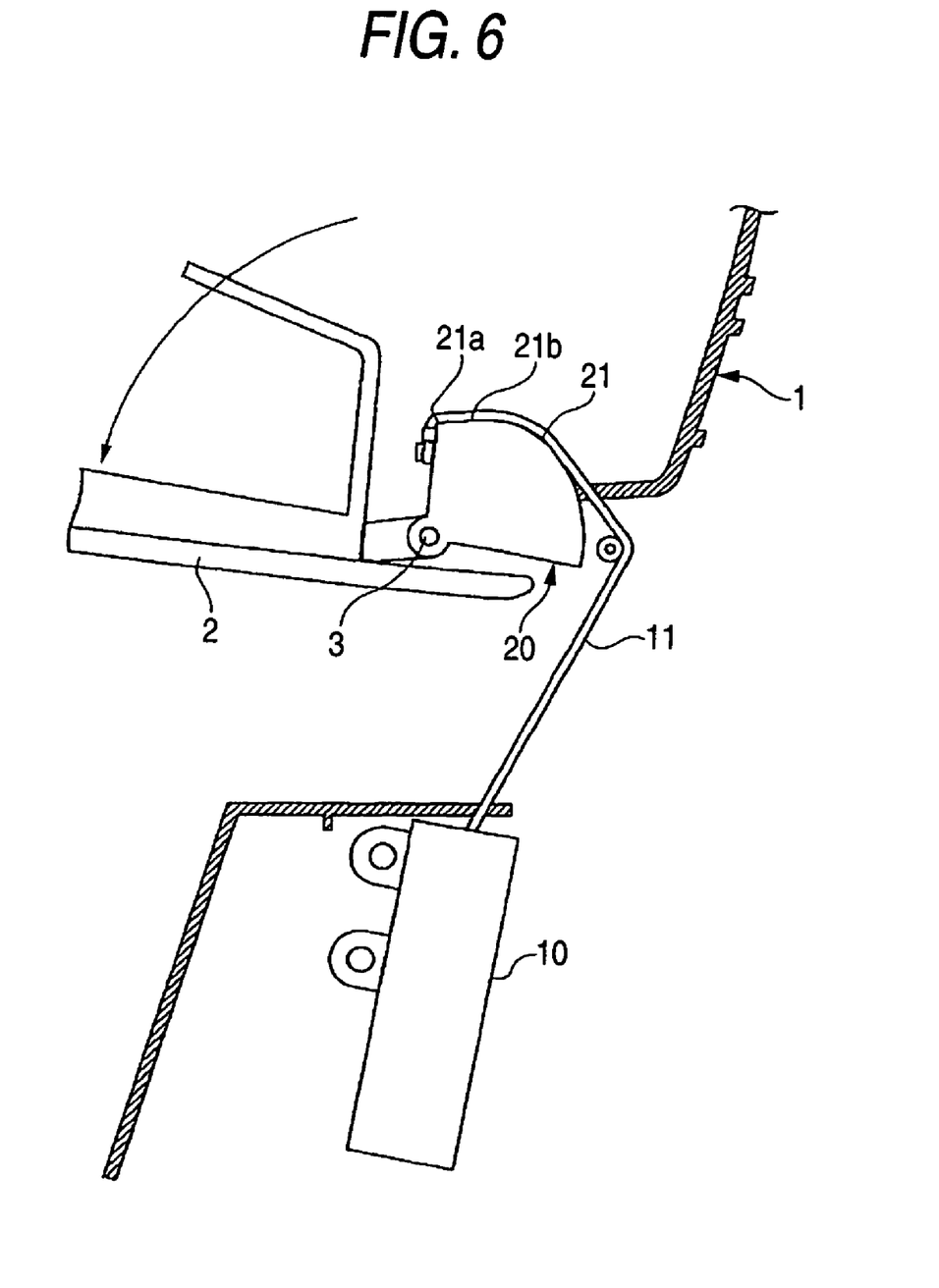
FIG. 6 is a sectional side view for explaining the operation of the glove box continued from FIG. 5.

After the connecting wire 11 has come into contact with the flat face 21b as shown in FIG. 5, the connecting wire 11 will be wound around the guide face 21 to be drawn out, as shown in FIG. 6, as the damping force control member 20 rotates integrally with the lid 2. Because the radius of rotation has been set longer in this region of the guide face 21 as described above, the amount of the connecting wire 11 to be drawn out per the unit rotation angle will be large, and the large damping force of the damper device 10 can be obtained.

It is to be noted that the invention is not limited to the above described embodiment.

Figure 7A:
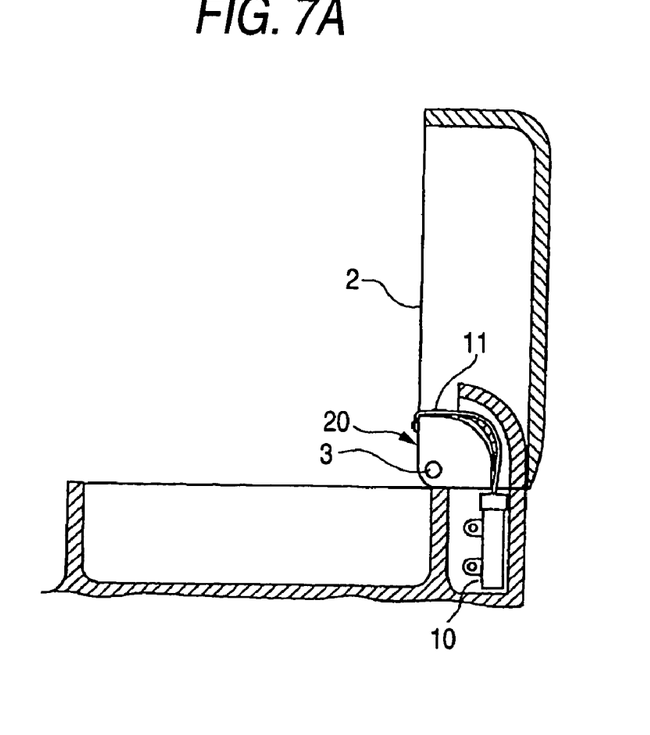
FIGS. 7A and 7B are sectional side views showing a modified example of the invention.
Figure 7B:
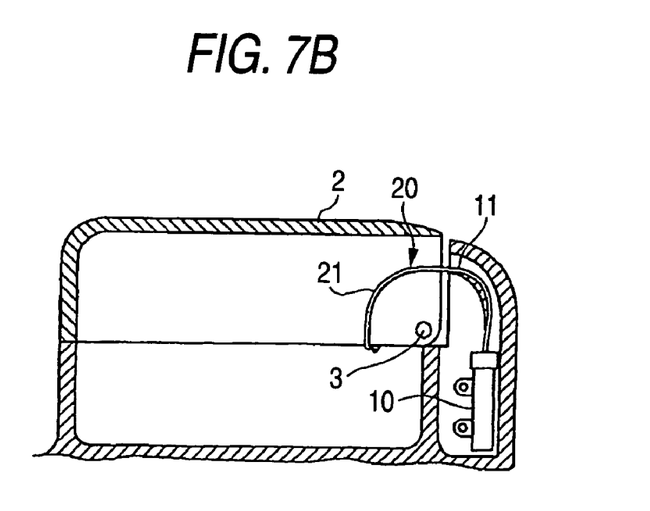

For example, even in a storage device for a vehicle in which the lid 2 takes the fully opened state in its upright position, and the completely closed state in its horizontal position as shown in FIGS. 7A and 7B, it is possible to control, by employing the damping force control member 20, that when the lid 2 rotates in the opening direction from the fully opened state, the damping force by the damper device 10 may be smaller in an initial stage, and thereafter, a gradually larger damping force can be obtained.

Figure 8A:
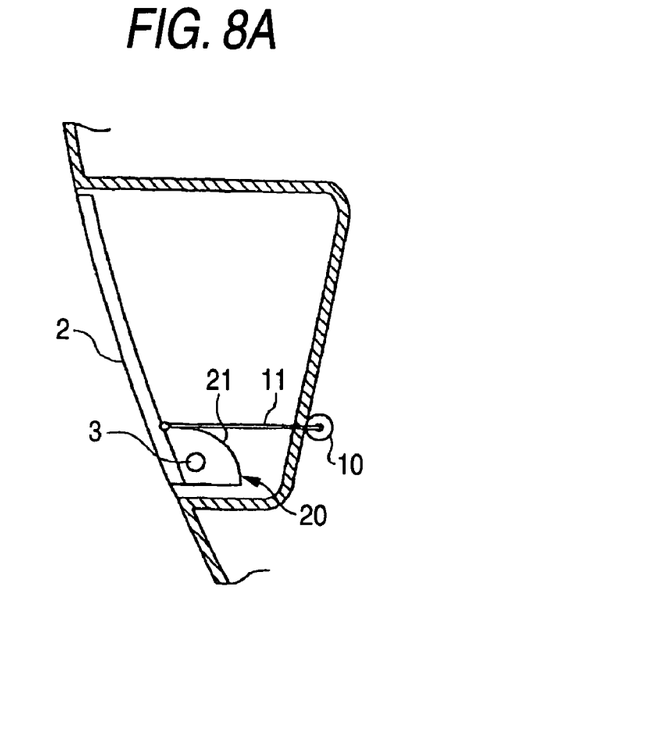
FIGS. 8A and 8B are sectional side views showing another modified example of the invention.
Figure 8B:
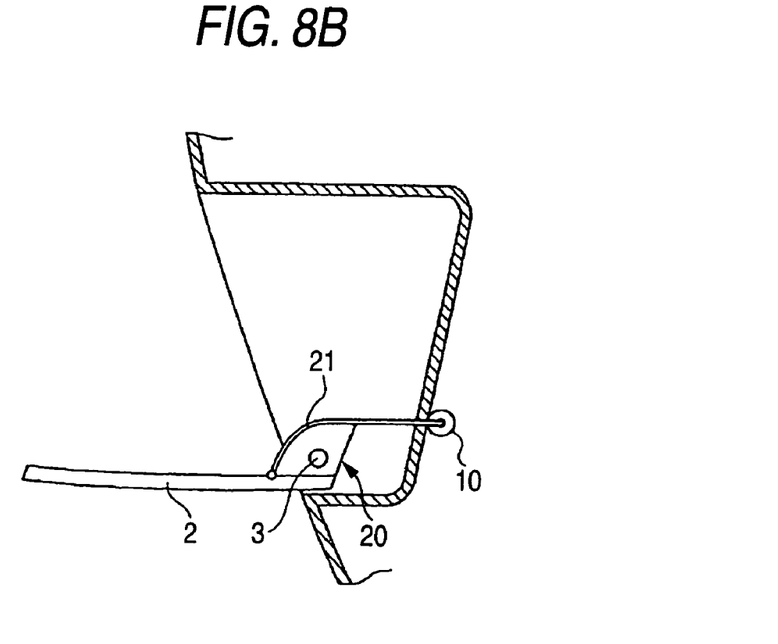

Also, in a storage device for a vehicle in which the lid 2 takes the fully opened state in its horizontal position rotated from an inclined position, as shown in FIGS. 8A and 8B, a large rotation moment will be exerted by the own weight of the lid 2 from the initial stage of the opening motion. In this case, by setting the guide face 21 of the damping force control member 20 to have a large radius of rotation from the starting end, a large damping force of the damper device 10 can be obtained in an entire region of the opening motion.

What is claimed is:

1. A storage apparatus for a vehicle, comprising:
    a lid which rotates about a pivot; and
    a damper device including a cord-shaped connecting member, said damper device generates a damping force against a pulling force from the connecting member, wherein when the lid rotates in a direction, the connecting member is pulled and generates the damping force in the damper device, wherein a damping force control member, having a guide face for the connecting member, is fixed to the lid, wherein when the lid has rotated in a direction of receiving the damping force, the connecting member is wound around the guide face pulled, and wherein the guide face of the damping force control member has radiuses of rotation which have been adjusted according to rotation moments of the lid by its own weight at corresponding rotation angles.

2. The storage apparatus for a vehicle according to claim 1, wherein the guide face of the damping force control member has the radius of rotation which has been set to be shorter in a region of a fixed range from a winding starting end of the connecting member, as compared with the radius of rotation at a terminal end, when the rotation moment by the own weight is small in an initial stage in which the lid rotates in a direction of receiving the damping force.

3. The storage apparatus for a vehicle according to claim 2, wherein the guide face of the damping force control member comprises a flat face in the region of the fixed range from the starting end, and wherein when the lid has rotated by a fixed angle in the direction of receiving the damping force, the connecting member comes in contact with the region substantially at the same time.

4. A storage apparatus for a vehicle, comprising:

a lid which rotates about a pivot;

a damper device including a cord-shaved connecting member, said damper device generates a damping force against a pulling force from the connecting member; and a guide member, around which the connecting member extending from the damper device is wound, for guiding the connecting member to the damping force control member, wherein when the lid rotates in a direction, the connecting member is pulled and generates the damping force in the damper device, wherein a damping force control member, having a guide face for the connecting member, is fixed to the lid, and wherein when the lid has rotated in a direction of receiving the damping force, the connecting member is wound around the guide face and pulled.

* * * * *